US012536929B2

(12) United States Patent
Silva

(10) Patent No.: US 12,536,929 B2
(45) Date of Patent: Jan. 27, 2026

(54) PROGRAMMABLE SIGN DEVICE

(71) Applicant: Jeff Silva, San Diego, CA (US)

(72) Inventor: Jeff Silva, San Diego, CA (US)

( * ) Notice: Subject to any disclaimer, the term of this patent is extended or adjusted under 35 U.S.C. 154(b) by 135 days.

(21) Appl. No.: 18/439,433

(22) Filed: Feb. 12, 2024

(65) Prior Publication Data

US 2025/0259572 A1 Aug. 14, 2025

(51) Int. Cl.
*G09F 13/04* (2006.01)
*G09F 9/302* (2006.01)

(52) U.S. Cl.
CPC ........ *G09F 13/0472* (2021.05); *G09F 9/3023* (2013.01); *G09F 13/0463* (2021.05)

(58) Field of Classification Search
CPC ... G09F 13/047; G09F 9/3023; G09F 13/0463
See application file for complete search history.

(56) References Cited

U.S. PATENT DOCUMENTS

| | | | | |
|---|---|---|---|---|
| 4,325,197 | A * | 4/1982 | Achten | G09F 15/0006 40/607.1 |
| D637,651 | S | 5/2011 | Hase | |
| 9,286,815 | B1 * | 3/2016 | Smith | G09F 15/0056 |
| 10,304,417 | B2 | 5/2019 | Park | |
| 10,385,525 | B1 * | 8/2019 | Pongracz | F16M 13/02 |
| 10,412,800 | B1 | 9/2019 | Beattie | |
| 10,417,908 | B2 | 9/2019 | Nicholson | |
| 10,957,284 | B1 | 3/2021 | Nay | |
| 11,348,492 | B1 | 5/2022 | Hoinowski | |
| 11,494,148 | B1 | 11/2022 | Lindberg | |
| 2015/0082674 | A1 * | 3/2015 | Wagner | G09F 13/22 40/544 |
| 2018/0280783 | A1 * | 10/2018 | Gordon | G06F 3/0488 |
| 2020/0238155 | A1 * | 7/2020 | German | G09F 9/301 |
| 2020/0257487 | A1 * | 8/2020 | Yu | G06F 3/1454 |
| 2023/0025888 | A1 | 1/2023 | Liu | |

FOREIGN PATENT DOCUMENTS

| | | |
|---|---|---|
| WO | WO2018225914 | 12/2018 |

* cited by examiner

*Primary Examiner* — Gary C Hoge

(57) ABSTRACT

A programmable sign device includes a personal electronic device that is in wireless communication with an extrinsic communication network. A plurality of sign units is each strategically positionable at or around a predetermined location to be visible to individuals that are approaching the predetermined location. Each of the plurality of sign units displays a customizable message to visually communicate a notification to the individuals pertaining to the predetermined location. A plurality of communication units is each attached to a respective one of the plurality of sign units. Each of the plurality of communication units is in wireless communication with the extrinsic communication network thereby and each of the plurality of communication units receives information from the personal electronic device to facilitate an authorized user to program the pertinent information about the location into the plurality of sign units.

5 Claims, 9 Drawing Sheets

PROGRAMMABLE SIGN DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sign devices and more particularly pertains to a new sign device for temporarily displaying programable signage around a pre-determined location for alerting individuals of potential hazards in the pre-determined location. The device includes a stand and a panel attached to the stand and a plurality of displays, each integrated into the panel, for displaying information pertaining to the location and any potential hazards. The device includes a communication unit integrated into the panel that is in remote communication with a personal electronic device, via an extrinsic communication network, to facilitate the plurality of displays to be remotely programmed.

(2) Description of Related Art Including Information Disclosed Under 37 CFR 1.97 and 1.98

The prior art relates to sign devices including a wide variety of portable and programmable electronic signs that each at least includes a display and remote communication with a mobile device for remotely programming a message to be displayed on the display. In no instance does the prior art disclose a portable electronic sign that includes a plurality of displays that each displays a unique message including the date and the time of day and a message and remote communication with a mobile electronic device for remotely programming the date and the time of day and the message.

BRIEF SUMMARY OF THE INVENTION

An embodiment of the disclosure meets the needs presented above by generally comprising a personal electronic device that is in wireless communication with an extrinsic communication network. A plurality of sign units is each strategically positionable at or around a predetermined location to be visible to individuals that are approaching the predetermined location. Each of the plurality of sign units displays a customizable message to visually communicate a notification to the individuals pertaining to the predetermined location. A plurality of communication units is each attached to a respective one of the plurality of sign units. Each of the plurality of communication units is in wireless communication with the extrinsic communication network thereby and each of the plurality of communication units receives information from the personal electronic device to facilitate an authorized user to program the pertinent information about the location into the plurality of sign units.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
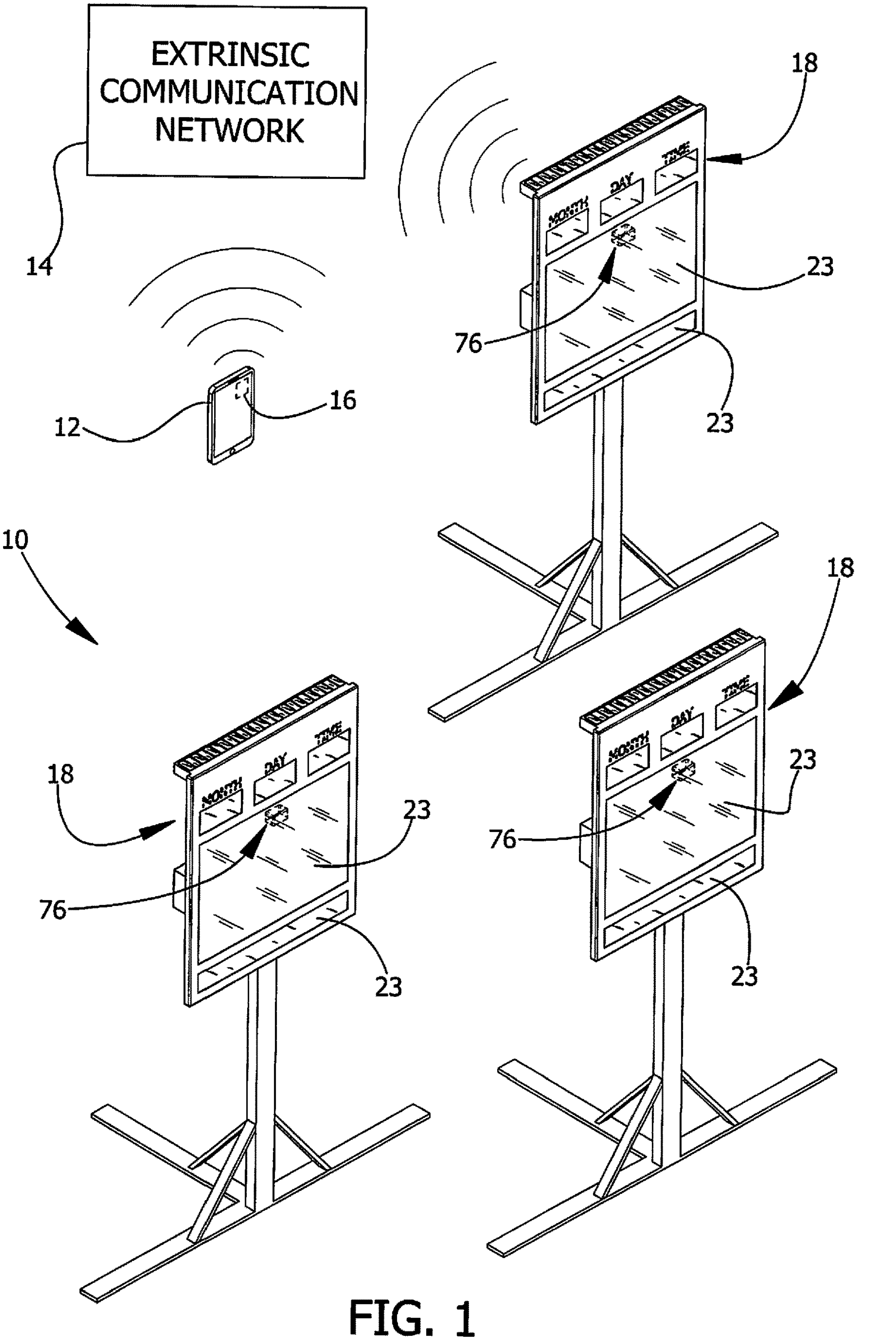
FIG. 1 is a perspective view of a programmable sign device according to an embodiment of the disclosure.
Figure 2:
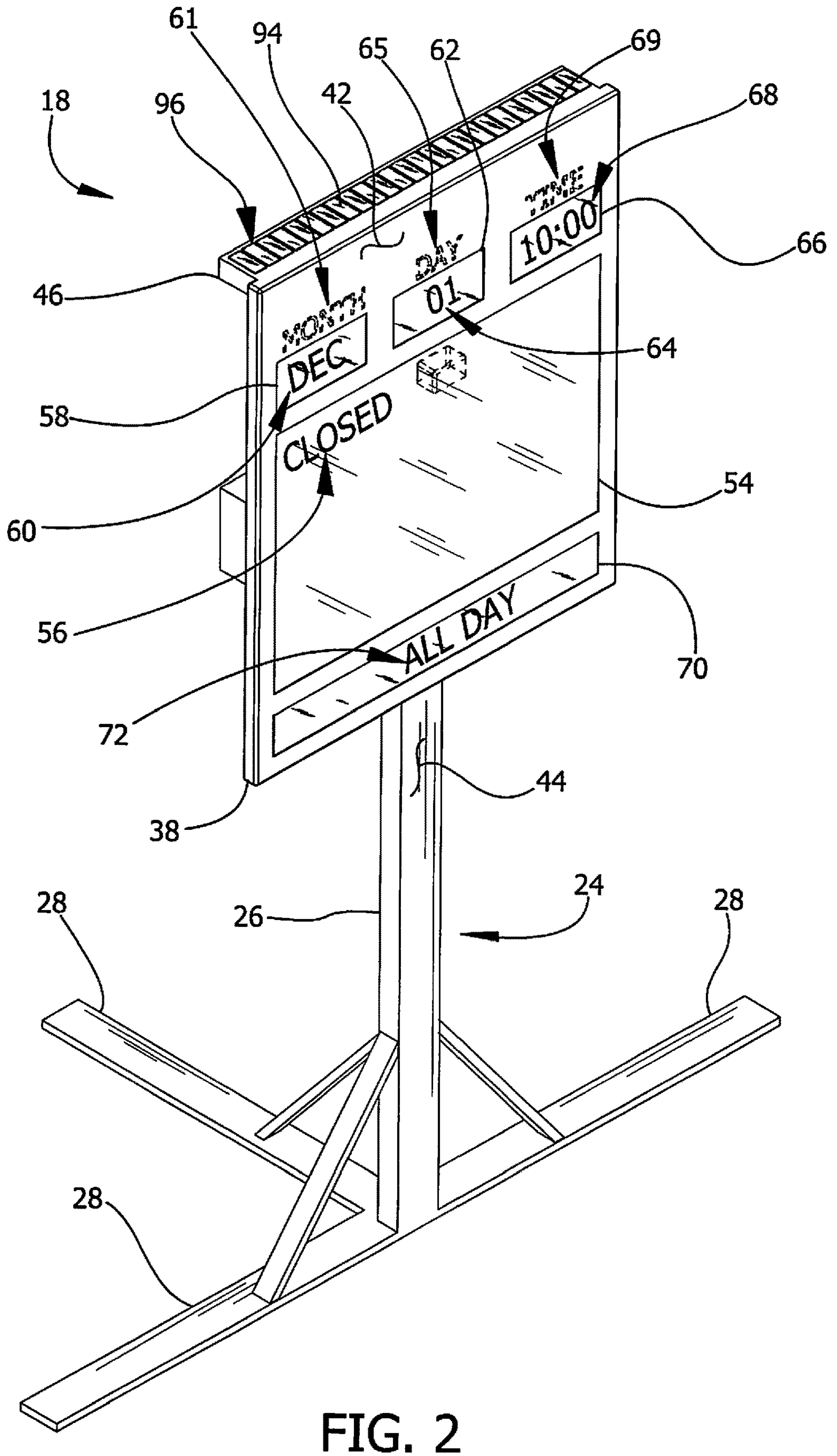
FIG. 2 is a front perspective view of an embodiment of the disclosure.
Figure 3:
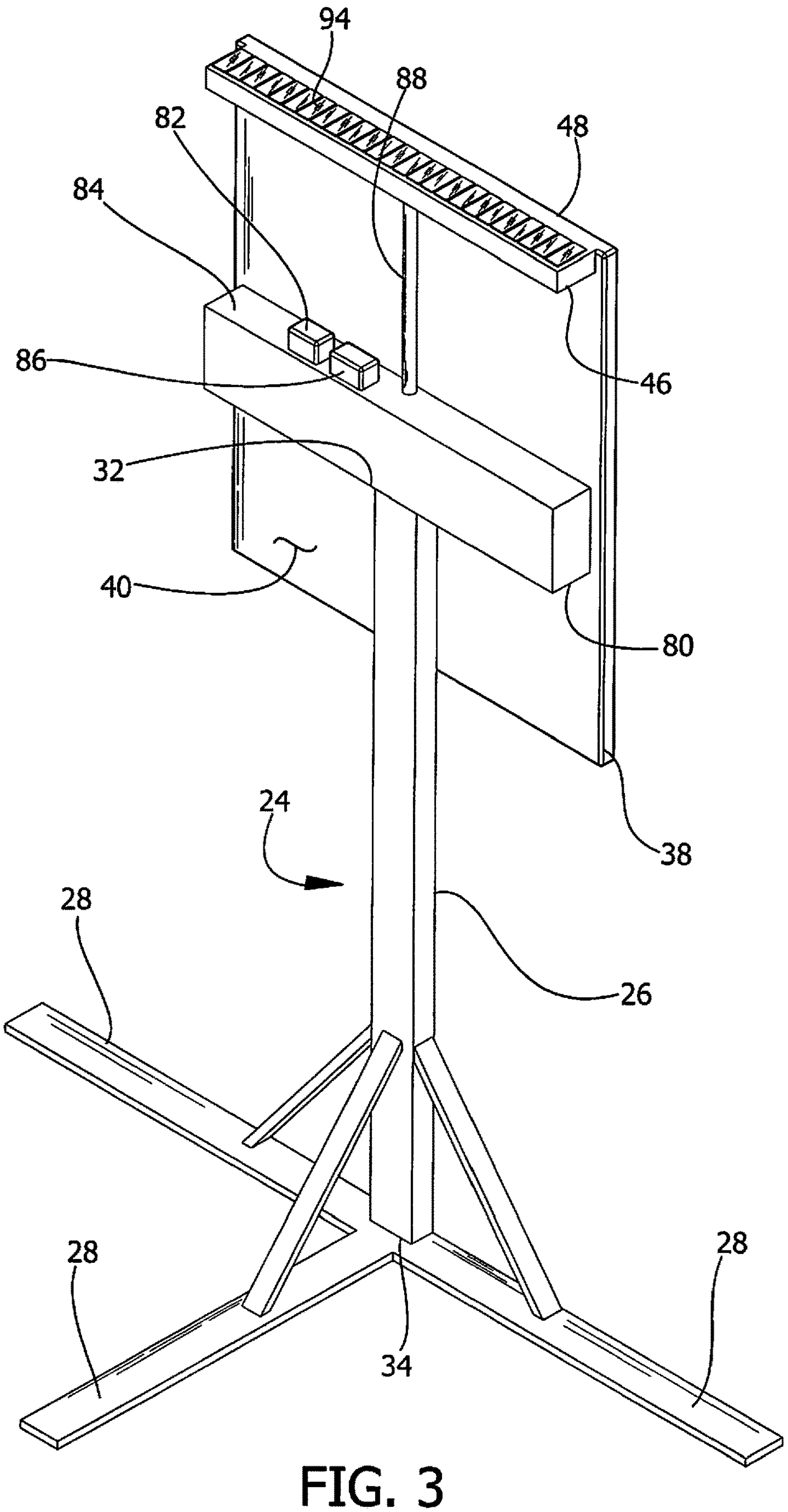
FIG. 3 is a back perspective view of an embodiment of the disclosure.
Figure 4:
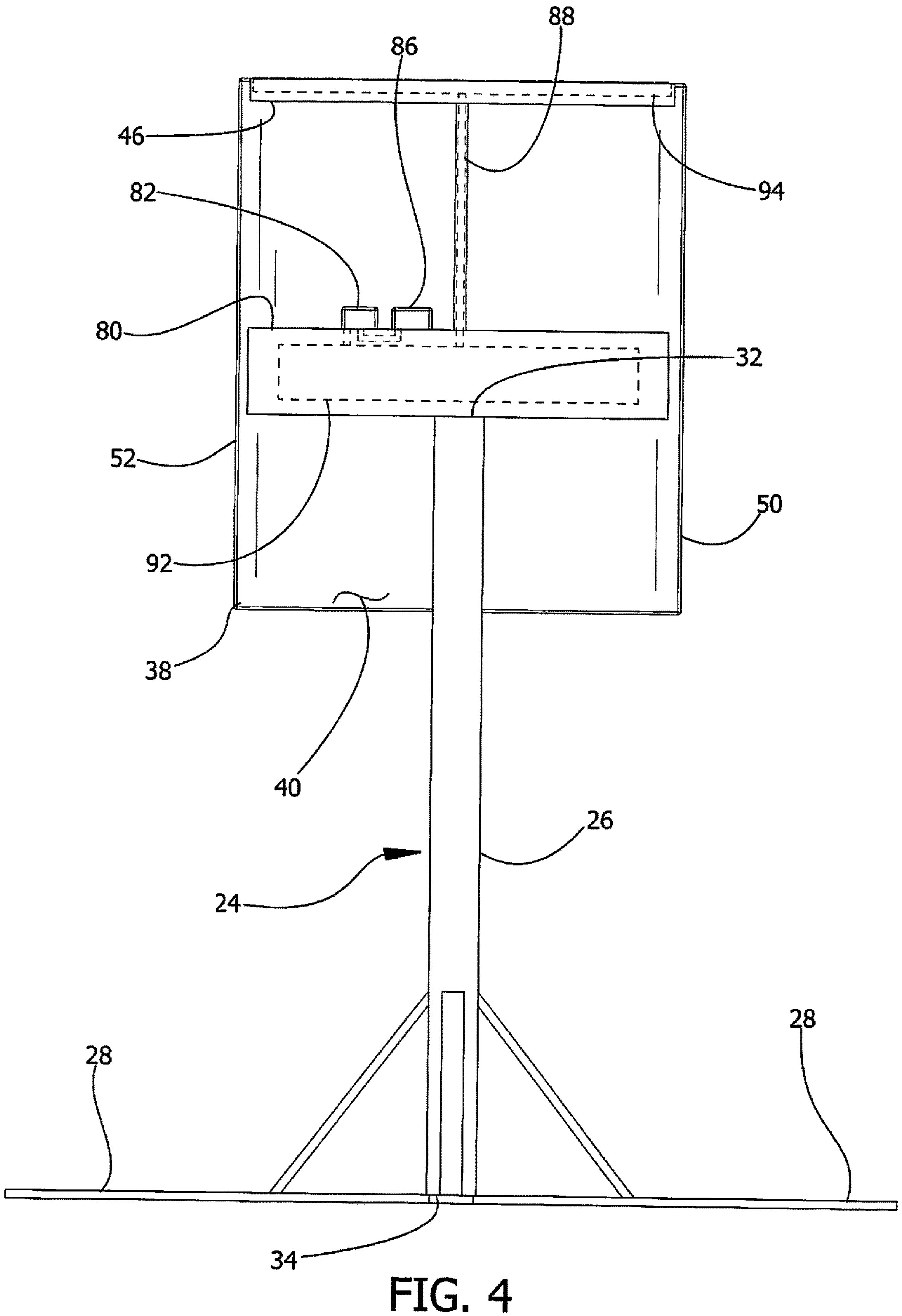
FIG. 4 is a back phantom view of an embodiment of the disclosure.
Figure 5:
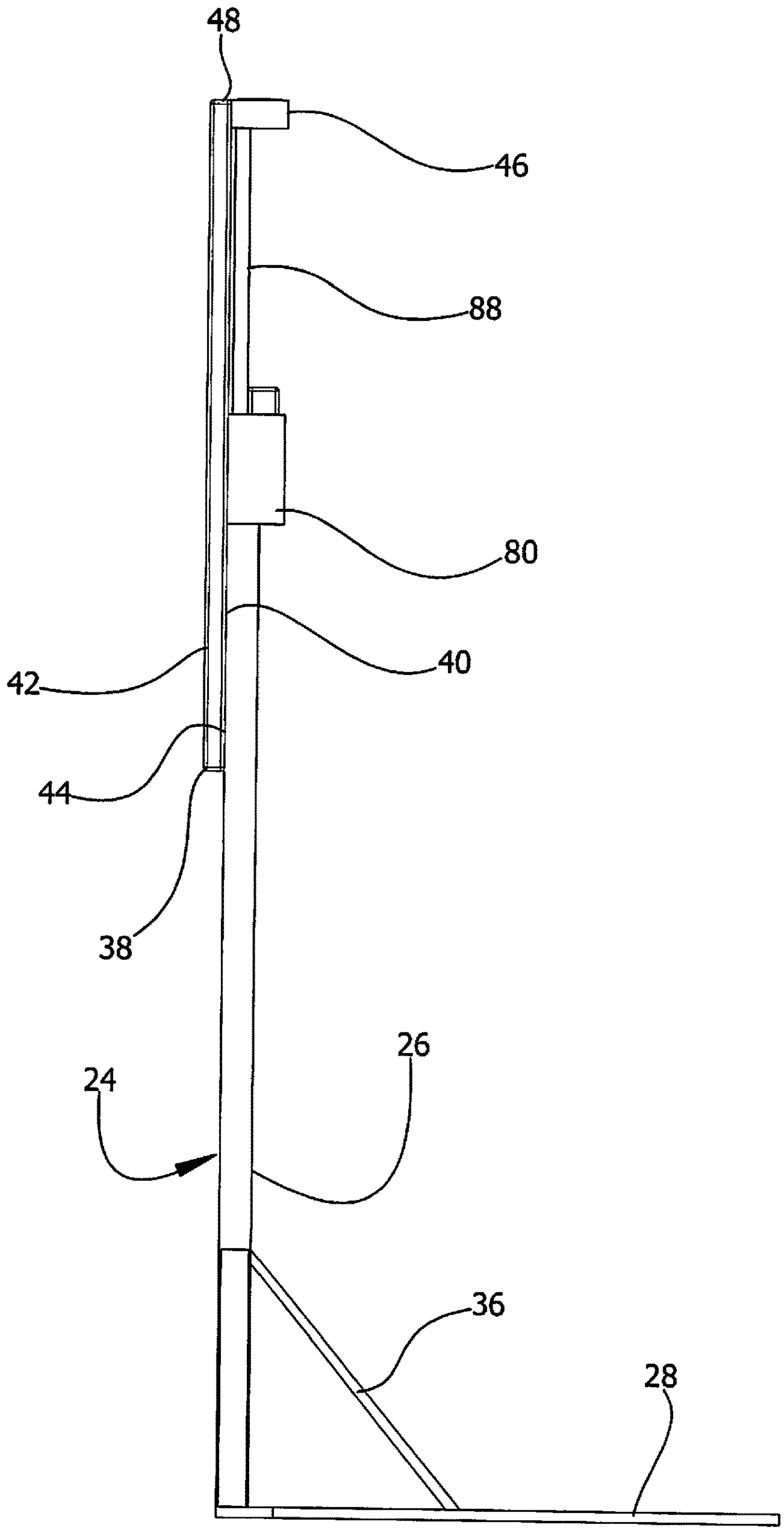
FIG. 5 is a left side view of an embodiment of the disclosure.
Figure 6:
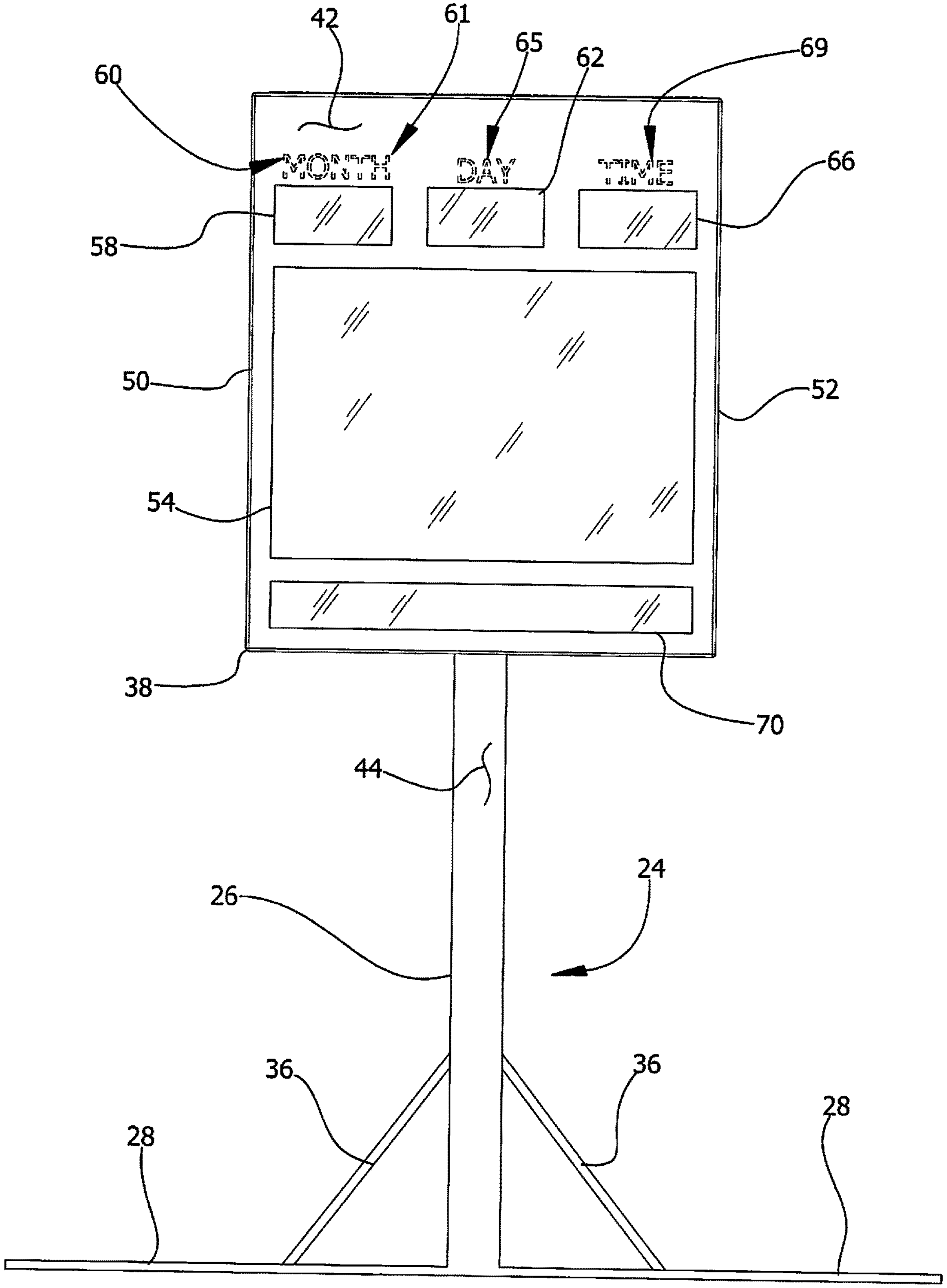
FIG. 6 is a front view of an embodiment of the disclosure.
Figure 7:
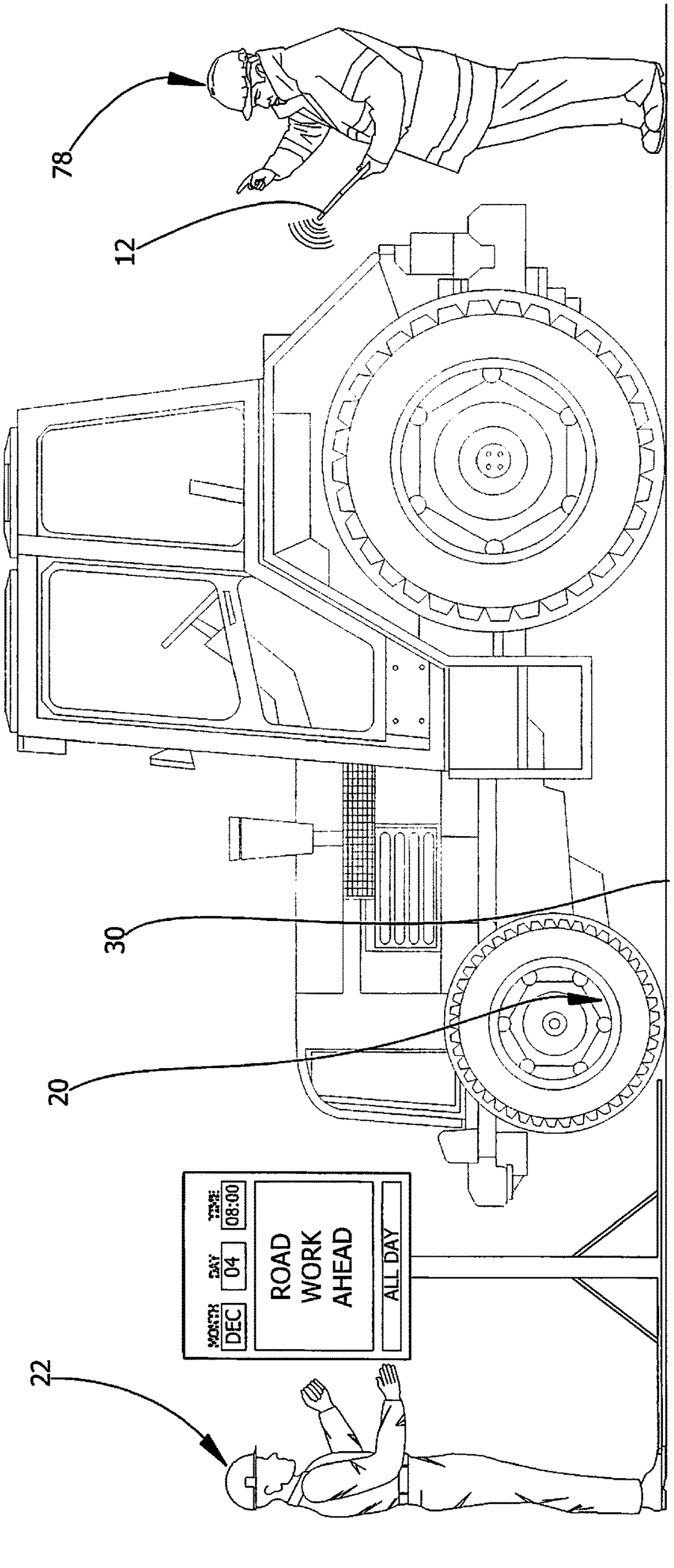
FIG. 7 is a perspective in-use view of an embodiment of the disclosure.
Figure 8:
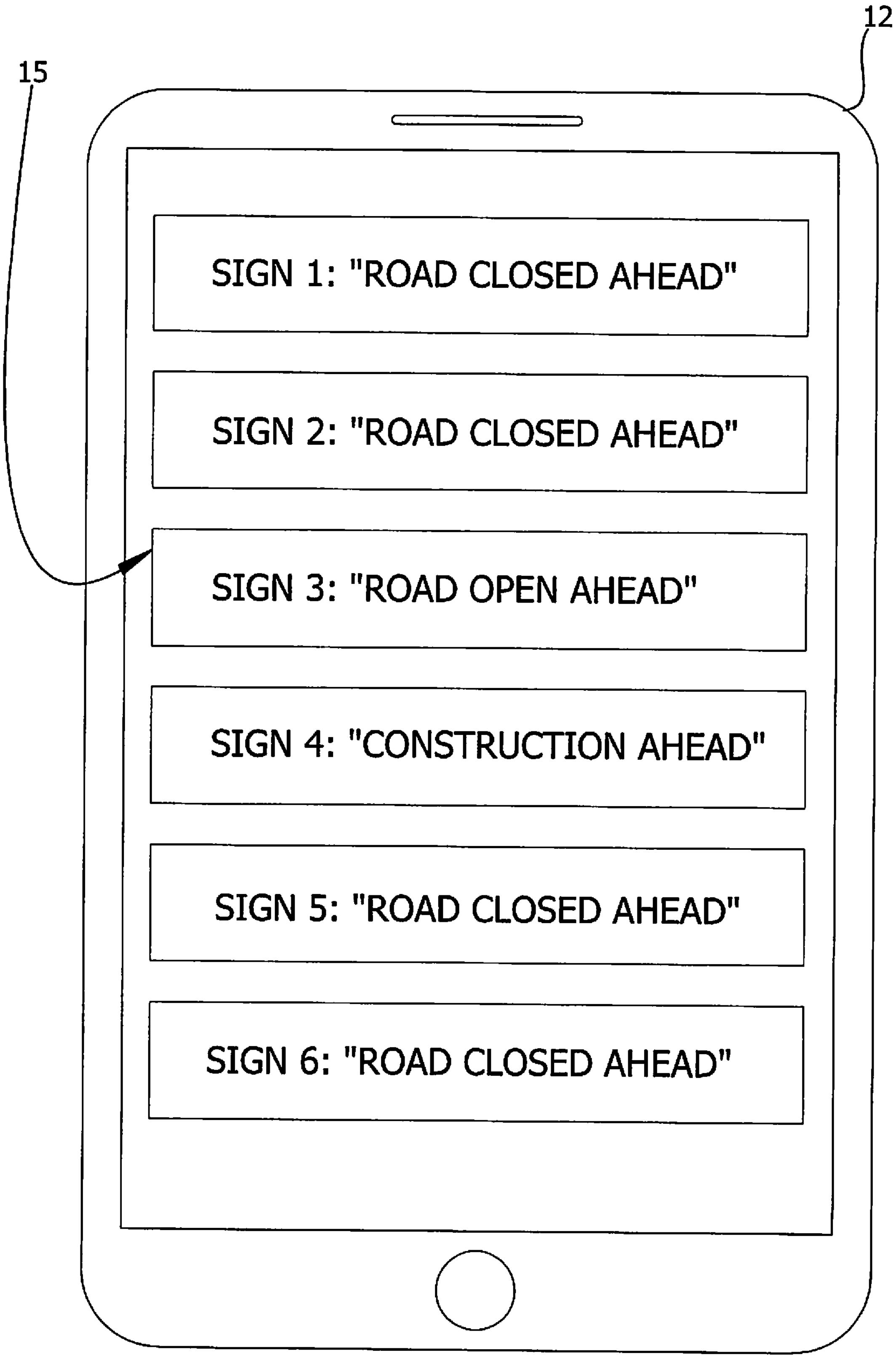
FIG. 8 is a perspective view of a personal electronic device of an embodiment of the disclosure showing a menu being displayed on the personal electronic device.
Figure 9:
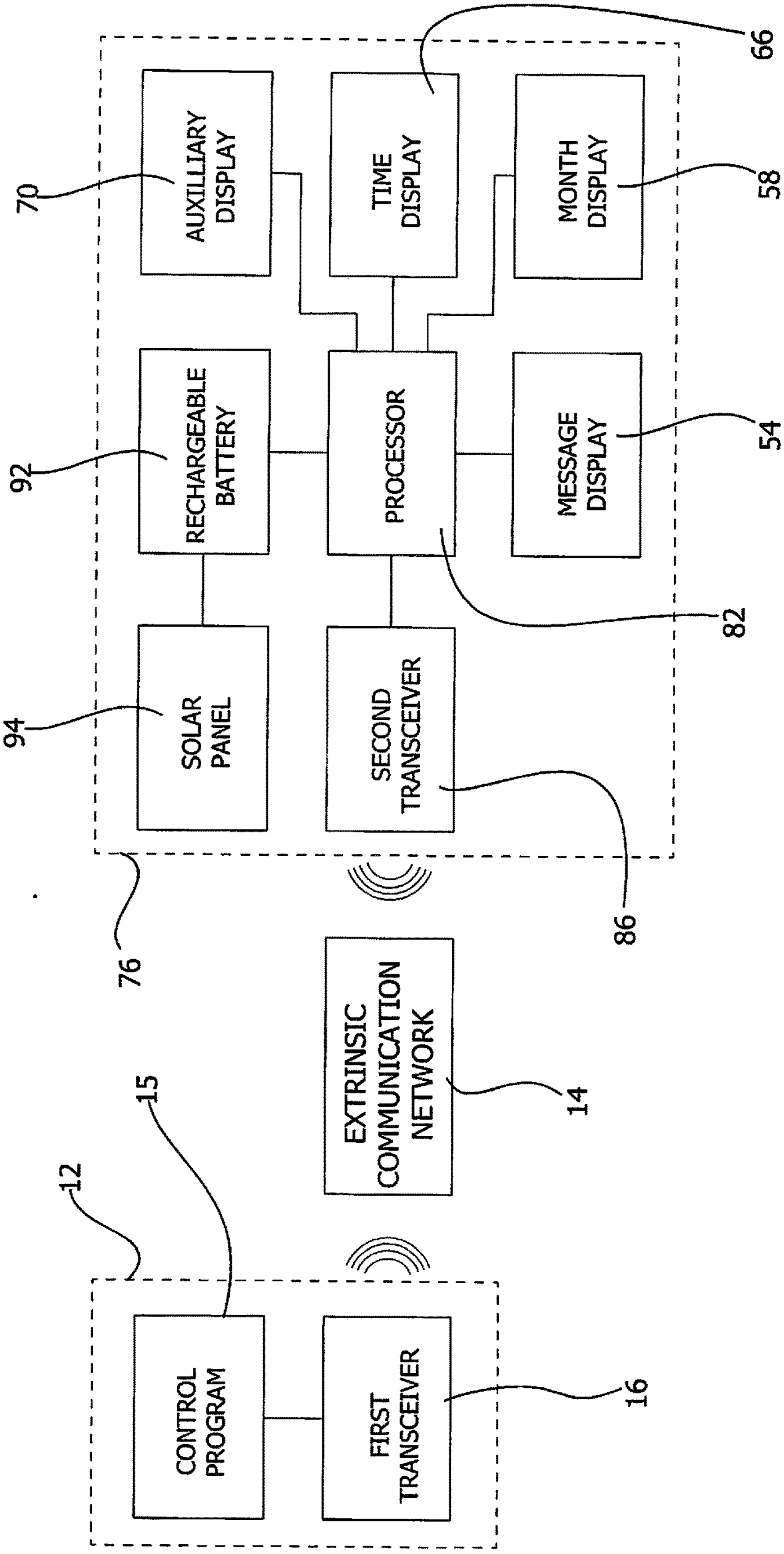
FIG. 9 is a schematic view of an embodiment of the disclosure.

With reference now to the drawings, and in particular to FIGS. 1 through 9 thereof, a new sign device embodying the principles and concepts of an embodiment of the disclosure and generally designated by the reference numeral 10 will be described.

As best illustrated in FIGS. 1 through 9, the programmable sign device 10 generally comprises a personal electronic device 12 that is in wireless communication with an extrinsic communication network 14. The personal electronic device 12 may comprise a smart phone or the like and the extrinsic communication network 14 may comprise the internet, a cellular phone network or any other type of wireless global communication system. Additionally, the personal electronic device 12 stores digital data comprising a control program 15 and the personal electronic device 12 includes a first transceiver 16 that is in wireless communication with the extrinsic communication network 14. The first transceiver 16 may comprise a radio frequency transceiver or the like commonly associated with smart phones. The control program 15 may comprise a smart phone application or the like which facilitates text communication.

A plurality of sign units 18 is provided and each of the plurality of sign units 18 is strategically positionable at or around a predetermined location 20. In this way each of the plurality of sign units 18 is visible to individuals 22 that are approaching the predetermined location 20. The predetermined location 20 may be a road construction zone, for example, or other location 20 that has conditions which could potentially pose a hazard to the individuals 22. Each of the plurality of sign units 18 displays the calendar date and a customizable message thereby visually communicating a notification to the individuals 22 which pertains to the predetermined location 20. Each of the sign units 18 includes a plurality of displays 23 for displaying various messages.

Each of the plurality of sign units 18 comprises a stand 24 which includes a stanchion 26 and a plurality of legs 28 radiating outwardly from the stanchion 26; the plurality of legs 28 lie on a support surface 30 having the stanchion 26 being vertically oriented. The support surface 30 may comprise the ground, a floor or any other horizontal support surface 30. The stanchion 26 has a top end 32 and a bottom end 34 and each of the plurality of legs 28 is perpendicularly oriented with the stanchion 26 adjacent to the bottom end 34. A respective pair of the plurality of legs 28 extends laterally away from the stanchion 26 in opposite directions from each other and a respective one of the plurality of legs 28 extends rearwardly from the stanchion 26. The stand 24 includes a plurality of gussets 36 each extending between the stanchion 26 and a respective one of the plurality of legs 28 for retaining each of the plurality of legs 28 in the perpendicular orientation with the stanchion 26.

Each of the sign units 18 includes a panel 38 which has a rear surface 40 and a front surface 42 and a forward surface 44 of the stanchion 26 is attached to the rear surface 40 of the panel 38 such that the top end 32 of the stanchion 26 is centrally located on the rear surface 40. In this way the panel 38 is elevated above the support surface 30 thereby facilitating the panel 38 to be visible to the individuals 22 that are approaching the location 20. The panel 38 has a ledge 46 which extends rearwardly from the rear surface 40 of the panel 38. The ledge 46 is aligned with a top edge 48 of the panel 38 and the ledge 46 extends between a first lateral edge 50 and a second lateral edge 52 of the panel 38.

Each of the sign units 18 includes a message display 54 that is integrated into the front surface 42 of the panel 38. The message display 54 displays indicia 56 comprising letters and words to visually communicate pertinent information about the location 20 to the individuals 22. The pertinent information may be a phrase such as "Road construction ahead. Reduce speed" or other type of the message to alert the individuals 22 to conditions that require the individuals 22 to use caution. The message display 54 is centrally located on the front surface 42 and the message display 54 may comprise a light emitting diode display or other type of electronic display.

Each of the sign units 18 includes a month display 58 that is integrated into the front surface 42 of the panel 38. The month display 58 displays indicia 60 comprising letters to visually communicate to the individuals 22 the month of the year to which the pertinent information applies. The month display 58 is positioned between the message display 54 and the top edge 48 of the panel 38 and the month display 58 is positioned proximate the first lateral edge 50 of the panel 38. Additionally, the month display 58 may comprise a light emitting diode display or other type of electronic display and indicia 61 may be applied to front surface 42 of the panel 38, located above the month display 58, comprising the word "Month".

Each of the sign units 18 includes a day display 62 that is integrated into the front surface 42 of the panel 38. The day display 62 displays indicia 64 comprising numbers to visually communicate to the individuals 22 the day of the month to which the pertinent information applies. The day display 62 is positioned between the message display 54 and the top edge 48 of the panel 38 and the day display 62 is centrally located between the first lateral edge 50 of the panel 38 and the second lateral edge 52 of the panel 38. Additionally, the day display 62 may comprise a light emitting diode display or other type of electronic display and indicia 65 may be applied to the front surface 42 of the panel 38, located above the day display 62, comprising the word "Day".

Each of the sign units 18 includes a time display 66 that is integrated into the front surface 42 of the panel 38. The time display 66 displays indicia 68 comprising numbers to visually communicate to the individuals 22 the time of the day to which the pertinent information applies. The time display 66 is positioned between the message display 54 and the top edge 48 of the panel 38 and the time display 66 is positioned proximate the second lateral edge 52 of the panel 38. Additionally, the time display 66 may comprise a light emitting diode display or other type of electronic display and indicia 69 may be applied to the front surface 42 of the panel 38, located above the time display 66, comprising the word "Time".

Each of the sign units 18 includes an auxiliary display 70 that is integrated into the front surface 42 of the panel 38. The auxiliary display 70 displays indicia 72 comprising words that serve as additional information regarding the information displayed on the message display 54, such as the hours during the day to which the pertinent information applies. The auxiliary display 70 is positioned between the message display 54 and a bottom edge 74 of the panel 38 and the auxiliary display 70 is elongated to extend substantially between the first lateral edge 50 and the second lateral edge 52 of the panel 38. Additionally, the auxiliary display 70 may comprise a light emitting diode display or other type of electronic display.

A plurality of communication units 76 is provided and each of the plurality of communication units 76 is attached to a respective one of the plurality of sign units 18. Each of the plurality of communication units 76 is in wireless communication with the extrinsic communication network 14 thereby facilitating the personal electronic device 12 to be in remote communication with each of the plurality of communication units 76 regardless of the distance between the personal electronic device 12 and the plurality of communication units 76. Each of the plurality of communication units 76 receives information from the personal electronic device 12 thereby facilitating each of the sign units 18 to display the information received from the personal electronic device 12. In this way the plurality of communication units 76 facilitates an authorized user 78 who is carrying the personal electronic device 12 to program the pertinent information about the location 20 unit the plurality of sign units 18. Furthermore, each of the plurality of communication units 76 is assigned a unique identity with respect to each other in the control program 15 that is stored in the personal electronic device 12.

Each of the plurality of communication units 76 comprises a battery housing 80 that is attached to the rear surface 40 of the panel 38 of a respective one of the sign units 18. The battery housing 80 is positioned above the top end 32 of the stanchion 26 and the battery housing 80 is elongated to extend substantially between the first lateral edge 50 and the second lateral edge 52 of the panel 38. Each of the communication units 76 includes a processor 82 that is attached to a top wall 84 of the battery housing 80. The processor 82 is electrically coupled to each of the message display 54, the month display 58, the day display 62, the time display 66 and the auxiliary display 70. Additionally, the processor 82 is positioned closer to the second lateral edge 52 of the panel 38 than the first lateral edge 50 of the panel 38. Each of the plurality of communication units 76 includes a second transceiver 86 that is attached to the top wall 84 of the battery housing 80. The second transceiver 86 is electrically coupled to the processor 82 and the second transceiver 86 is in wireless communication with the extrinsic communication network 14 thereby facilitating the second transceiver 86 to receive the information from the control program 15 in the personal electronic device 12. The second transceiver 86 may comprise a radio frequency transceiver or the like and the second transceiver 86 may employ a WPAN signal or other type of protocol that facilitates the second transceiver 86 to connect to the internet or cellular phone network.

Each of the plurality of communication units 76 includes a conduit 88 which extends between the top wall 84 of the battery housing 80 and a bottom side 90 of the ledge 46 on the rear surface 40 of the panel 38. Additionally, the conduit 88 is centrally located on the rear surface 40 of the panel 38. Each of the plurality of communication units 76 includes a rechargeable battery 92 that is positioned within the battery housing 80 and the rechargeable battery 92 is electrically coupled to the processor 82. Each of the plurality of communication units 76 includes a solar panel 94 that is integrated into a top side 96 of the ledge 46 on the rear surface 40 of the panel 38 such that the solar panel 94 is exposed to sunlight. The solar panel 94 is electrically coupled to the rechargeable battery 92 for charging the rechargeable battery 92.

In use, each of the sign units 18 is positioned at a strategic location 20 at or near the predetermined location 20 and the personal electronic device 12 is connected to the communication unit on each of the sign units 18. The control program 15 stored in the personal electronic device 12 is employed to program the message to be displayed on the message display 54 of each of the sign units 18 and to program any additional information that is to be displayed on the auxiliary display 70 of each of the sign units 18. Additionally, the control program 15 automatically programs the month and day and time to be displayed on the month display 58 and the day display 62 and the time display 66 on each of the sign units 18. In this way the individuals 22 can view the message displayed on the message display 54 on a respective sign unit 18 to be alerted to the potential hazards that the individuals 22 might encounter in the location 20 they are moving toward. As is most clearly shown in FIG. 8, the control program in the personal electronic device includes a menu of preselected phrases that can be programmed into sign units, including but not being limited to, "road closed ahead", "road open ahead" or "construction ahead" and each of the pre-selected phrases can be assigned to the unique identity of communication units 76. Each of the sign units 18 can be reprogrammed at any time to display different information and the sign units 18 can be removed from service once work being performed at the location 20 is completed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A programmable sign device for facilitating any message to be remotely programmed and subsequently displayed, said device comprising:

a personal electronic device being in wireless communication with an extrinsic communication network;

a plurality of sign units, each of said plurality of sign units being strategically positionable at or around a predetermined location wherein each of said plurality of sign units is configured to be visible to individuals that are approaching the predetermined location, each of said plurality of sign units displaying the calendar date and a customizable message wherein each of said plurality of sign units is configured to visually communicate a notification to the individuals pertaining to the predetermined location, each of said sign units including a plurality of displays for displaying various messages;

a plurality of communication units, each of said plurality of communication units being attached to a respective one of said plurality of sign units, each of said plurality of communication units being in wireless communication with said extrinsic communication network thereby facilitating said personal electronic device to be in remote communication with each of said plurality of communication units regardless of the distance between said personal electronic device and said plurality of communication units, each of said plurality of communication units receiving information from said personal electronic device thereby facilitating each of said sign units to display the information received from said personal electronic device;

wherein each of said plurality of sign units comprises a stand comprising a stanchion and a plurality of legs radiating outwardly from said stanchion wherein said plurality of legs is configured to lie on a support surface having said stanchion being vertically oriented;

wherein each of said plurality of sign units comprises a panel having a rear surface and a front surface, said panel being attached to said stanchion wherein said panel is configured to be elevated above the support surface thereby facilitating said panel to be visible to the individuals that are approaching the location;

wherein said plurality of displays includes a message display being integrated into said panel, said message display displaying indicia comprising letters and words wherein said message display is configured to visually communicate pertinent information about the location to the individuals;

wherein said plurality of displays includes a month display being integrated into said panel, said month display displaying indicia comprising letters wherein said month display is configure to visually communicate to the individuals the month of the year to which the pertinent information applies;

wherein said plurality of displays includes a day display being integrated into said panel, said day display displaying indicia comprising numbers wherein said day display is configured to visually communicate to the individuals the day of the month to which the pertinent information applies;

wherein said plurality of displays includes a time display being integrated into said panel, said time display displaying indicia comprising numbers wherein said time display is configure to visually communicate to the individuals the time of the day to which the pertinent information applies; and wherein said plurality of displays includes an auxiliary display being integrated into said panel, said auxiliary display displaying indicia comprising words wherein said auxiliary display is configure to visually communicate to the individuals additional information regarding the information displayed on said message display;

wherein said stanchion has a top end and a bottom end;

wherein each of said plurality of legs is perpendicularly oriented with said stanchion adjacent to said bottom end;

wherein a respective pair of said plurality of legs extends laterally away from said stanchion in opposite directions from each other;

wherein a respective one of said plurality of legs extends rearwardly from said stanchion;

wherein said stand includes a plurality of gussets each extending between said stanchion and a respective one of said plurality of legs for retaining each of said plurality of legs in said perpendicular orientation with said stanchion;

wherein a forward surface of said stanchion is attached to said rear surface of said panel such that said top end of said stanchion is centrally located on said rear surface;

wherein said panel has a ledge extending rearwardly from said rear surface of said panel;

wherein said ledge is aligned with a top edge of said panel; and wherein said ledge extends between a first lateral edge and a second lateral edge of said panel.

2. The assembly according to claim 1, wherein:

said message display is centrally located on said front surface of said panel;

said month display being positioned between said message display and said top edge of said panel, said month display being positioned proximate said first lateral edge of said panel;

said day display is positioned between said message display and said top edge of said panel, said day display being centrally located between said first lateral edge of said panel and said second lateral edge of said panel;

said time display is positioned between said message display and said top edge of said panel, said time display being positioned proximate said second lateral edge of said panel; and said auxiliary display is positioned between said message display and a bottom edge of said panel, said auxiliary display being elongated to extend substantially between said first lateral edge and said second lateral edge of said panel.

3. The assembly according to claim 1, wherein:

said personal electronic device storing digital data comprising a control program, said personal electronic device including a first transceiver being in wireless communication with said extrinsic communication network; and each of said plurality of communication units comprises:

a battery housing being attached to said rear surface of said panel of a respective one of said sign units, said battery housing being positioned above said top end of said stanchion, said battery housing being elongated to extend substantially between said first lateral edge and said second lateral edge of said panel;

a processor being attached to a top wall of said battery housing, said processor being electrically coupled to each of said message display and said month display and said day display and said time display and said auxiliary display, said processor being positioned closer to said second lateral edge of said panel than said first lateral edge of said panel; and a second transceiver being attached to said top wall of said battery housing, said second transceiver being electrically coupled to said processor, said second transceiver being in wireless communication with said extrinsic communication network thereby facilitating said second transceiver to receive the information from said control program in said personal electronic device.

4. The assembly according to claim 3, wherein each of said plurality of communication units includes:

a conduit extending between said top wall of said battery housing and a bottom side of said ledge on said rear surface of said panel, said conduit being centrally located on said rear surface of said panel;

a rechargeable battery being positioned within said battery housing, said rechargeable battery being electrically coupled to said processor; and a solar panel being integrated into a top side of said ledge on said rear surface of said panel wherein said solar panel is configured to be exposed to sunlight, said solar panel being electrically coupled to said rechargeable battery for charging said rechargeable battery.

5. A programmable sign device for facilitating any message to be remotely programmed and subsequently displayed, said device comprising:

a personal electronic device being in wireless communication with an extrinsic communication network, said personal electronic device storing digital data comprising a control program, said personal electronic device including a first transceiver being in wireless communication with said extrinsic communication network;

a plurality of sign units, each of said plurality of sign units being strategically positionable at or around a predetermined location wherein each of said plurality of sign units is configured to be visible to individuals that are approaching the predetermined location, each of said plurality of sign units displaying the calendar date and a customizable message wherein each of said plurality of sign units is configured to visually communicate a notification to the individuals pertaining to the predetermined location, each of said plurality of sign units including a plurality of displays for displaying various messages, each of said plurality of sign units comprising:

a stand comprising a stanchion and a plurality of legs radiating outwardly from said stanchion wherein said plurality of legs is configured to lie on a support surface having said stanchion being vertically oriented, said stanchion having a top end and a bottom end, each of said plurality of legs being perpendicularly oriented with said stanchion adjacent to said bottom end, a respective pair of said plurality of legs extending laterally away from said stanchion in opposite directions from each other, a respective one of said plurality of legs extending rearwardly from said stanchion, said stand including a plurality of gussets each extending between said stanchion and a respective one of said plurality of legs for retaining each of said plurality of legs in said perpendicular orientation with said stanchion;

a panel having a rear surface and a front surface, a forward surface of said stanchion being attached to said rear surface of said panel such that said top end of said stanchion is centrally located on said rear surface wherein said panel is configured to be elevated above the support surface thereby facilitating said panel to be visible to the individuals that are approaching the location, said panel having a ledge extending rearwardly from said rear surface of said panel, said ledge being aligned with a top edge of said panel, said ledge extending between a first lateral edge and a second lateral edge of said panel;

wherein said plurality of displays includes a message display being integrated into said front surface of said panel, said message display displaying indicia comprising letters and words wherein said message display is configured to visually communicate pertinent information about the location to the individuals, said message display being centrally located on said front surface;

wherein said plurality of displays includes a month display being integrated into said front surface of said panel, said month display displaying indicia comprising letters wherein said month display is configure to visually communicate to the individuals the month of the year to which the pertinent information applies, said month display being positioned between said message display and said top edge of said panel, said month display being positioned proximate said first lateral edge of said panel;

wherein said plurality of displays includes a day display being integrated into said front surface of said panel, said day display displaying indicia comprising numbers wherein said day display is configure to visually communicate to the individuals the day of the month to which the pertinent information applies, said day display being positioned between said message display and said top edge of said panel, said day display being centrally located between said first lateral edge of said panel and said second lateral edge of said panel;

wherein said plurality of displays includes a time display being integrated into said front surface of said panel, said time display displaying indicia comprising numbers wherein said time display is configure to visually communicate to the individuals the time of the day to which the pertinent information applies, said time display being positioned between said message display and said top edge of said panel, said time display being positioned proximate said second lateral edge of said panel; and wherein said plurality of displays includes an auxiliary display being integrated into said front surface of said panel, said auxiliary display displaying indicia comprising words wherein said auxiliary display is configured to visually communicate to the individuals additional information regarding the information displayed on said message display, between said message display and a bottom edge of said panel, said auxiliary display being elongated to extend substantially between said first lateral edge and said second lateral edge of said panel; and a plurality of communication units, each of said plurality of communication units being attached to a respective one of said plurality of sign units, each of said plurality of communication units being in wireless communication with said extrinsic communication network thereby facilitating said personal electronic device to be in remote communication with each of said plurality of communication units regardless of the distance between said personal electronic device and said plurality of communication units, each of said plurality of communication units receiving information from said personal electronic device thereby facilitating each of said sign units to display the information received from said personal electronic device wherein said plurality of communication units is configured to facilitate an authorized user to program the pertinent information about the location unit said plurality of sign units, each of said plurality of communication units comprising:

a battery housing being attached to said rear surface of said panel of a respective one of said sign units, said battery housing being positioned above said top end of said stanchion, said battery housing being elongated to extend substantially between said first lateral edge and said second lateral edge of said panel;

a processor being attached to a top wall of said battery housing, said processor being electrically coupled to each of said message display and said month display and said day display and said time display and said auxiliary display, said processor being positioned closer to said second lateral edge of said panel than said first lateral edge of said panel;

a second transceiver being attached to said top wall of said battery housing, said second transceiver being electrically coupled to said processor, said second transceiver being in wireless communication with said extrinsic communication network thereby facilitating said second transceiver to receive the information from said control program in said personal electronic device;

a conduit extending between said top wall of said battery housing and a bottom side of said ledge on said rear surface of said panel, said conduit being centrally located on said rear surface of said panel;

a rechargeable battery being positioned within said battery housing, said rechargeable battery being electrically coupled to said processor; and a solar panel being integrated into a top side of said ledge on said rear surface of said panel wherein said solar panel is configured to be exposed to sunlight, said solar panel being electrically coupled to said rechargeable battery for charging said rechargeable battery.

* * * * *